US011007941B2

(12) United States Patent
Wieczorek et al.

(10) Patent No.: US 11,007,941 B2
(45) Date of Patent: May 18, 2021

(54) ADJUSTING SYSTEM FOR A REAR VIEW ELEMENT OF A REAR VIEW DEVICE FOR A VEHICLE

(71) Applicant: SMR Patents S.à.r.l., Luxembourg (LU)

(72) Inventors: Romeo Wieczorek, Esslingen (DE); Peter Hein, Denkendorf (DE); David Jaeger, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 54 days.

(21) Appl. No.: 15/416,194

(22) Filed: Jan. 26, 2017

(65) Prior Publication Data

US 2017/0210296 A1    Jul. 27, 2017

(30) Foreign Application Priority Data

Jan. 27, 2016   (DE) .......................... 102016101441.9

(51) Int. Cl.
*B60R 1/12*    (2006.01)
*B60R 1/06*    (2006.01)
(Continued)

(52) U.S. Cl.
CPC .............. *B60R 1/12* (2013.01); *B60R 1/0602* (2013.01); *B60R 1/072* (2013.01); *B60R 1/088* (2013.01); *B60R 2001/1253* (2013.01)

(58) Field of Classification Search
CPC ......... B60R 1/12; B60R 1/072; B60R 1/0602; B60R 1/088; B60R 2001/1253; B60R 1/06; F16B 17/00; H05B 3/845
(Continued)

(56) References Cited

U.S. PATENT DOCUMENTS 3,624,347 A * 11/1971 Todd ..................... H05B 3/845
                                                                  219/219
5,015,824 A    5/1991  Monter et al.
(Continued)

FOREIGN PATENT DOCUMENTS

DE    29620775 U1    3/1998
EP    0989027 B1   10/2005
GB    2225993 A     6/1990

OTHER PUBLICATIONS

Patent Acts 1977: Search Report under Section 17(5), Application No. GB1701354.1, dated Aug. 22, 2017.
(Continued)

*Primary Examiner* — Stephone B Allen
*Assistant Examiner* — Rahman Abdur
(74) *Attorney, Agent, or Firm* — MacMillan, Sobanski & Todd, LLC (57) ABSTRACT

An adjusting system for a rear view element of a rear view device for a vehicle, preferably a motor vehicle, comprises a drive housing with an electrical interface, a socket and a mounting plate for the rear view element. The socket is in particular in the form of a jack socket, having a first end attached to the drive housing and an opening accessible at a second end of the socket, which is located opposite the first end of the socket. The mounting plate for the rear view element comprises a pin, in particular in form of a jack plug, wherein at least part of the pin is suited to be inserted into the opening of the socket, and the pin is adapted to mechanically and electrically connect the mounting plate to the drive housing via the socket. Also, the adjusting system relates to a rear view device and to a method for manufacturing the rear view device.

19 Claims, 4 Drawing Sheets

(51) Int. Cl.
*B60R 1/072* (2006.01)
*B60R 1/08* (2006.01)

(58) Field of Classification Search
USPC .......................... 359/872, 877, 507, 481, 512
See application file for complete search history.

(56) References Cited

U.S. PATENT DOCUMENTS

| | | | |
|---|---|---|---|
| 6,007,222 A | 12/1999 | Thau | |
| 6,244,714 B1* | 6/2001 | Mertens | B60R 1/0602 |
| | | | 248/479 |
| 7,490,944 B2* | 2/2009 | Blank | B60R 1/12 |
| | | | 359/838 |
| 8,858,002 B2* | 10/2014 | Suzuki | B60R 1/072 |
| | | | 359/872 |
| 9,242,606 B2* | 1/2016 | Mambourg | B60R 1/072 |
| 2004/0061920 A1* | 4/2004 | Tonar | B32B 17/06 |
| | | | 359/265 |
| 2005/0141116 A1 | 6/2005 | Schalkwijk et al. | |
| 2006/0061008 A1* | 3/2006 | Karner | B29C 45/0017 |
| | | | 264/250 |
| 2012/0229882 A1* | 9/2012 | Fish, Jr. | B60R 1/025 |
| | | | 359/267 |
| 2014/0376119 A1* | 12/2014 | Sobecki | B60R 1/074 |
| | | | 359/841 |

OTHER PUBLICATIONS

German Search Report, Application No. DE 102016101441.9, dated Nov. 23, 2016.

\* cited by examiner

ADJUSTING SYSTEM FOR A REAR VIEW ELEMENT OF A REAR VIEW DEVICE FOR A VEHICLE

CROSS-REFERENCE TO RELATED APPLICATIONS

This application claims priority to German Patent Application No. 10 2016 101 441.9 filed on Jan. 27, 2016, the disclosure of which is incorporated herein by reference in its entirety.

BACKGROUND OF THE INVENTION

This invention relates in general to rear view devices. In particular, this invention relates to an adjusting system for a rear view element of a rear view device for a vehicle, preferably a motor vehicle. The invention also relates to a rear view device for a vehicle, preferably for a motor vehicle comprising such an adjusting system and to a method for manufacturing such a rear view device.

In modern day vehicles, rear view elements such as the reflective elements that are employed in rear view devices for helping the driver see areas behind and to the sides of the vehicle, may comprise several electronic devices such as, for example, a heating element to prohibit condensation from forming on the rear view element, or a display of a blind sport indicator, etc. For example, U.S. Pat. No. 7,244,912 B1 describes a reflective element having a plurality of functional elements associated with the reflective element. Since these elements are all separately provided, they are also wired separately by means of a power supply harness extending through a slot in the plate carrying the reflective element.

EP 0 989 027 A2 describes a mechanism for adjusting the rear view element of a rear view device, where the rear view element comprises a heating element that is electrically connected to the battery of the vehicle. Here, the wiring extends to a joint socket on a drive housing which engages a joint head that is provided on a plate like adjusting disk to which the reflective element is attached to.

However, the adjusting systems that are known in the prior art employ a large amount of wirings and plugs to connect all the different electronic devices to their respective power supplies. Due to the amount of separate wiring and corresponding connections, the solutions known in the prior art are expensive, less durable, difficult to automate, and less safe to operate.

Therefore, the invention aims at providing an adjusting system for a rear view element that overcomes the above mentioned problems.

SUMMARY OF THE INVENTION

This invention relates to an adjusting system for a rear view element of a rear view device for a vehicle, preferably a motor vehicle. The invention also relates to a rear view device for a vehicle, preferably for a motor vehicle comprising such an adjusting system and to a method for manufacturing such a rear view device.

The invention provides an adjusting system for a rear view element of a rear view device for a vehicle, preferably a motor vehicle, comprising: a drive housing with an electrical interface and a socket, in particular in form of a jack socket, having a first end attached to the drive housing and an opening accessible at a second end of the socket, which is located opposite the first end of the socket; and a mounting plate for the rear view element comprising a pin, in particular in form of a jack plug, wherein at least part of the pin is suited to be inserted into the opening of the socket, and the pin is adapted to mechanically and electrically connect the mounting plate to the drive housing via the socket.

The adjusting system for a rear view element can be located in a housing of a rear view device such as a housing of an external door mirror. By means of the adjusting system, the horizontal and vertical tilt position of the rear view element can be adjusted and the mounting plate for the rear view element can be mechanically and electrically connected to the drive housing. Here, the term "rear view element" can be used to refer to a glass mirror, but also to refer to a camera that is installed instead of the glass mirror, or in addition to the glass mirror.

The drive housing having an electrical interface for electrically connecting the electrical components that are located inside the drive housing, or that are associated with the mounting plate for the rear view element to a power supply and/or controller. The electric interface could be, for example, an interface suited to connect a bus system, such as the LIN BUS that is used in the automotive industry. The drive housing also having a socket, in particular in form of a jack socket, having a first end attached to the drive housing and an opening accessible at a second end of the socket, which is located opposite the first end of the socket. The drive housing could be made of a plastic or metal material and could be suited to house at least one electrical motor.

The socket could have an essentially elongated shape and could comprise an essentially cylindrical opening that is suited to accommodate a pin that could be plugged into the socket. The socket is preferably a jack socket such as the 2.5, 3.5, 6.35 mm socket as known in the prior art having a plurality of socket contacts. However, the size and the amount of socket contacts can deviate from the standard sizes that are know in the art. Also, the first end of the socket is attached to the drive housing so that it is rigidly connected to the drive housing. Here, the term "first end of the socket" can be used to refer to that end of the socket that is located opposite the open end that is suited to accommodate a pin that could be plugged into the socket. For example, the socket could be located on the bottom plate of the drive housing at an angle of approximately 90° so that the socket can extend through the entire drive housing as an axis perpendicular to the bottom plate. The drive housing and the socket could be manufactured in one piece, or the socket could be attached to the drive housing by mechanical, and/or by chemical means.

The mounting plate for the rear view element comprises a pin, in particular in form of a jack plug, wherein at least part of the pin is suited to be inserted into the opening of the socket, and wherein the pin is adapted to mechanically and electrically connect the mounting plate to the drive housing via the socket. Here, the term "mounting plate" can be used to refer to the support of the rear view element. However, the mounting plate could also be a part of the rear view element, and electronic devices that are associated with the rear view element could be located on the mounting plate, or further components comprising the electronic devices could be arranged on the mounting plate. The pin that is attached to the mounting plate could be held by at least one bendable conductor that could be at least in part flexible and that could electrically connect the electronic devices associated with the mounting plate to the pin. The pin could be for example a jack plug which corresponds to the jack socket which is described above. The term "conductor" can be used herein to refer to a wire and/or a conductor that could be used to connect the pin to the drive housing. The number of different conductors that are employed could vary with the number of electrical components that are associated with the mounting plate.

Advantageously, by inserting the pin at least in part into the socket, an electrical connection and a mechanical connection between the drive housing and the mounting plate can be established. Therefore, all necessary connections can be quickly and efficiently made by only connecting the pin to the socket. Thus, the pin and socket connection realizes multiple functions that are realized in the prior art with several components, such as a screw, a pivot axis, and by various sockets and plugs.

In one example, a flared socket section is provided at or attached to the second end of the socket, in particular by means of a screw connection, with preferably the flared socket section comprising at least one recess for allowing to install the flared socket section with a mounting tool having a corresponding protrusion, and/or with preferably the flared socket section having substantially the form of a trumpet, and/or with preferably the flared socket section enabling a rocking movement of the mounting plate.

The term "flared" can be used to refer to the geometry of the flared socket section, where the diameter of the flared socket section can spread outwards from the point where it can be attached to the second end of the socket to a wider diameter towards its end. Therefore, the term "flared" can also be used to refer to a trumpet-like geometry. The flared socket section could have an opening for receiving at least part of the pin of the mounting plate, wherein the internal diameter of the opening is also increasing with the diameter of the flared socket section. Both, the second end of the socket and the flared socket section could comprise corresponding threads for connecting the flared socket section to the second end of the socket. Also, the flared socket section preferably comprises at least one recess for allowing to install the flared socket section using a mounting tool having a corresponding protrusion. For example, the flared socket section could comprise a geometry that is suitable to engage with the corresponding protrusion, or vice versa. Advantageously, the flared socket section enables the mounting plate to be at least in part tiltable about the drive housing, by allowing the conductors that connect the pin to the drive housing to pivotally move about the axis of the socket.

In one example, the socket is arranged on a bottom plate of the drive housing and extends substantially perpendicular to the bottom plate, and/or the longitudinal axis of the socket is arranged on an adjustment axis of the mounting plate, and/or the socket extends through the drive housing.

In one example, a drive housing lid is provided, with the drive housing lid comprising at least one through hole for the socket, preferably the drive housing lid being held on the drive housing by the flared socket section, when the flared socket section is attached to the second end of the socket. For example, the diameter of the flared socket section could be made slightly larger than the diameter of the through hole so that the drive housing lid can be kept in place by the flared socket section. Advantageously, before installing the adjusting system, the wiring inside the drive housing can be done while having the drive housing lid removed, and once all connections are in place, the drive housing lid can be quickly installed by means of the flared socket section.

In one example, the socket comprises at least one first socket contact in its opening and at least one second socket contact on its circumference which is electrically connected to the at least one first contact as well as the electrical interface, with preferably the first socket contact being spring loaded and/or being arranged on an inlay in the socket opening, and/or the second socket contact being spring loaded and/or being connectable to the electrical interface, and the pin comprises at least one pin contact that is suited to connect to the at least one first socket contact, wherein preferably the socket comprises at least two, preferably three, most preferably five, first and second socket contacts and the pin comprises at least two, preferably three, most preferably five, corresponding pin contacts.

The at least one first socket contact can be spring loaded and can be comprised on a inlay that is located on the inside of the socket, where the spring loaded contact could be adapted to be displaced while the pin is inserted into the socket, and then move back to its original position by means of the spring, when the pin is at least in part inserted into the socket to establish a connection between the two contacts. The socket and pin could each comprise three corresponding contacts for the positive and negative pole of a DC power source as well as a third contact for a bus signal that could be adapted to control the electrical components that might be associated with the mounting plate. Alternatively, the electrical components associated with the mounting plate could be also controlled individually, where a switched power supply is individually connected to each electrical component. In the latter case, the socket and the pin could comprises five corresponding contacts. However, depending on the amount and type of electrical components that are used more or less contacts could be employed. Also, if more than at least one first socket and at least one pin contacts are employed, the first socket contacts could be vertically arranged above each other, while the corresponding pin contacts could be equally arranged above each other on the circumference of the pin and being isolated from each other. Advantageously, a plurality of connections can be established at once, when the pin is at least partially inserted into the socket.

In one example, a PCB board is provided within the drive housing and/or is electrically and mechanically connected to the socket, with preferably the socket being soldered on the PCB board, or the socket being pressed in the PCB board, or the PCB board being molded with or to the socket, in particular by making usage of a hotmelt, and/or the PCB board comprising the electrical interface for connecting the adjusting system to a bus, in particular a LIN Bus, or a control unit of the rear view device and/or the vehicle. The PCB board could be located in the drive housing and could comprise a controller for controlling the electrical components associated with the mounting plate as well as controlling the drive, e.g. electrical motor, for moving the rear view element. For example, the controller could comprise a memory function that readjusts the rear view element automatically to a pre-set, or to a last known location. For example, the at least one second socket contact could be electrically connected to the PCB board for electrically connecting the socket to the PCB board. Also, the PCB board could be connected to various other devices that could be located in a rear view device, such as a puddle light, a powerfold, or an indicator.

In one example, the adjusting system comprising at least one bendable conductor to electrically and mechanically connect the mounting plate to the pin, preferably so that the mounting plate can pivot at an angle of up to approximately 15° with respect to the pin and/or around the longitudinal axis of the pin and/or on the flared socket section. The at least one bendable conductor could be, for example, a thin strip of metal such as copper, or an alloy that can be bent back and forth without getting adversely affected. As described above with reference to the previous examples, three, four, five, or even more pin contacts could be utilized in the pin. In these examples, three, four, five, or even more strips of metal could be employed.

In one example, the at least one bendable conductor is suited to connect to the mounting plate by means of at least one rivet and/or by soldering, with preferably each bendable conductor being suited to connect to at least one pin contact of the pin, and/or the at least one bendable conductor is at least in part encapsulated in a flexible and/or isolating material, in particular in form of a thermoplastic adhesive material, like a hotmelt or the like, with preferably a plurality of bendable conductors being at least in part encapsulated in the flexible isolating material, and/or the at least one bendable conductor has a substantially L shaped form, and/or a plurality of bendable conductors being connected in an essentially crown-shaped manner around the at least one pin. The at least one bendable conductor could be, for example, embedded in a thermoplastic adhesive material, such as for example in a hotmelt material. Advantageously, by embedding the at least one bendable conductor in a flexible insulating material, the individual conductors can be isolated from each other and a carcass can be formed that allows to be easily bend back and forth without getting destroyed. Also, the flexible insulating material ensures that the bendable conductors remain flexibly encapsulated without the risk of accidentally touching each other. Also, the use of hotmelt material has the advantage that it can connect to metal material as well as to the material of the mounting plate, for example to a foil attached to the mounting plate having an adhesive dispersed thereon. This provides a durable connection between the two components. For example, due to the flexibility of the carcass, the mounting plate could be tiltable through approximately 15 degrees about the drive housing when the pin is installed in the socket. Advantageously, such a connection is very reliable and can withstand more than 20000 bending movements in varying climate conditions, without getting destroyed. Also, as described above with reference to the previous examples, three, four, or five pin contacts could be utilized in the pin. In the latter case, each bendable conductor can be connected to the mounting plate by means of at least one rivet each. Advantageously, rivets provide a permanent and long lasting mechanical connection. Also, advantageously, when the rivets are placed in an essentially crown shaped manner on the mounting plate, the defrosting of a heating element that could be arranged on the mounting plate will not be adversely affected.

In one example, the mounting plate comprises or carries a heating element, which is electrically connected via the pin and the socket, with preferably the heating element being arranged on the mounting plate around the at least one pin, and/or the mounting plate comprises or carries an electrochromic dimming element, which is electrically connected via the pin and the socket, and/or the mounting plate comprises or carries a display element, which is electrically connected via the pin and the socket, with display element preferably comprising or being comprised by a blind spot indicator.

In one example, the adjusting system comprising at least one drive element, in particular in form of an electric motor, and/or guide means, preferably connected to the drive element, for adjusting the mounting plate. The electric motor could be connected to the mounting plate by guide means that move the mounting plate. For example, the guide means could change their position depending on the rotation angle of the at least one electric motor. The guide means could be attached to the mounting plate at an off-center position so that the mounting plate could be tiltable about the pin and socket connection when the adjusting system is being fully installed.

In one example, the adjusting system comprising a rear view element mounted on the mounting plate, wherein the rear view element comprises at least one mirror element and/or camera.

The invention also relates to a rear view device for a vehicle, preferably for a motor vehicle, comprising at least one adjusting system according to the invention, wherein the electrical interface enables an electrical connection of the adjusting system via a single cable to at least one unit of the rear view device and/or the vehicle.

In one example, the unit comprises a control unit, a powerfold unit, a turn signal unit, a paddle light unit and/or camera unit, and/or the cable comprises a plus line, a ground line, a bus line and at least one output line.

Further, the invention relates to a method for manufacturing a rear view device according to the invention, with inserting the pin of the mounting plate into the opening of the socket of the drive housing for a simultaneous mechanical and electrical connection between the mounting plate and the drive housing.

In one example, the method further comprising attaching the drive housing lid to the drive housing, in particular the bottom plate of the drive housing, by attaching the flared socket section to the socket prior to the insertion of the pin into the socket.

Various aspects of this invention will become apparent to those skilled in the art from the following detailed description of the preferred embodiment, when read in light of the accompanying drawings.

DETAILED DESCRIPTION OF THE PREFERRED EMBODIMENT

Referring now to the drawings, there is illustrated in FIGS. 1a, 1b, 1c, and 1d a drive housing 1 according to an embodiment of the invention, wherein the drive housing 1 is shown from above with and without having a drive housing lid 3 and two electrical motors 2, 2' installed, and a schematic view is given showing the drive housing 1 from below. From FIGS. 1a, 1b, 1c and 1d it can be seen that the drive housing 1 has an electrical interface 4 which could be a bus interface, such as a LIN (local interconnect network) BUS interface. However, the skilled person would know that the electrical interface 4 could alternatively, or additionally connect the drive housing 1 to a power supply and/or to a controller.

Figure 1A:
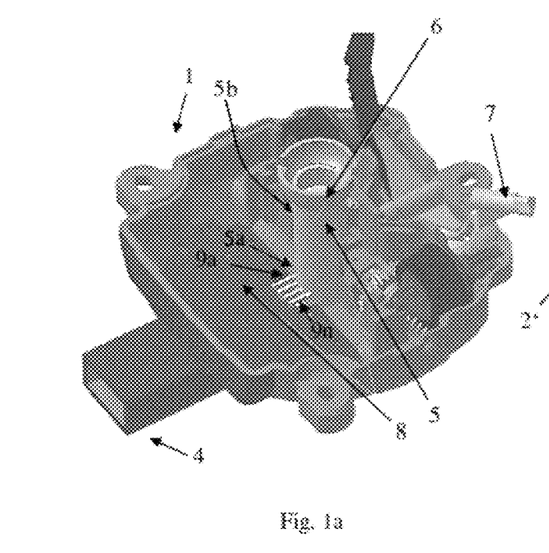
FIG. 1*a* is an illustration of a top view of an embodiment a drive housing according to of the invention, the drive housing is illustrated with the cover lid removed and without electric motors.
Figure 1B:
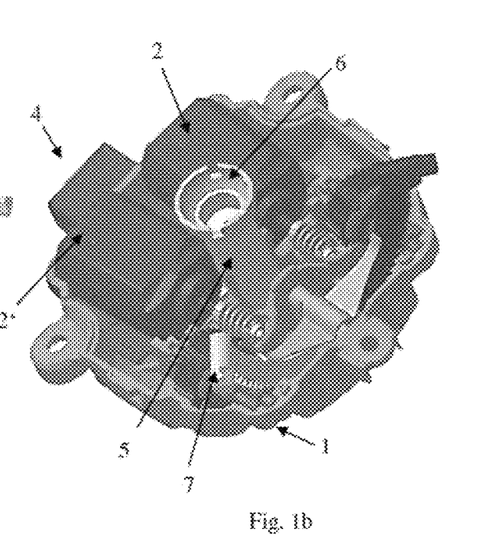
FIG. 1*b* is an illustration of a top view of the embodiment the drive housing of FIG. 1*a* illustrated with the cover lid removed and with electric motors.
Figure 1C:
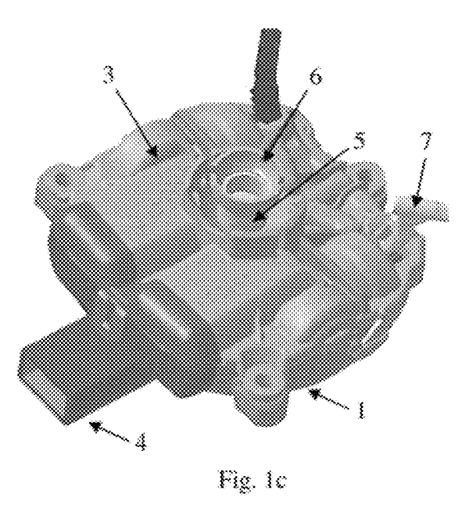
FIG. 1*c* is an illustration of the drive housing of FIG. 1*b* with a drive housing lid installed.
Figure 1D:
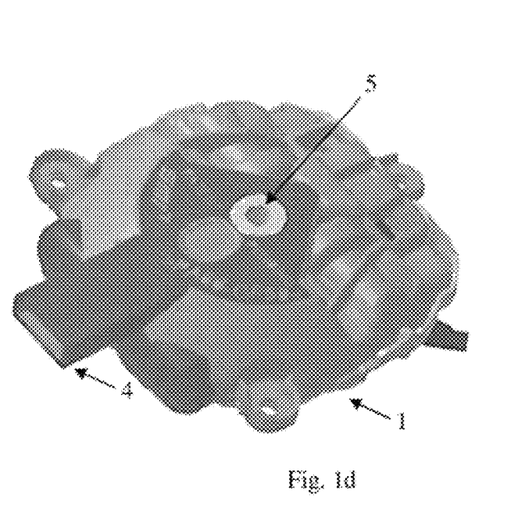
FIG. 1*d* is a bottom view of the drive housing of FIGS. 1*a*-1*c*.
Figure 2A:
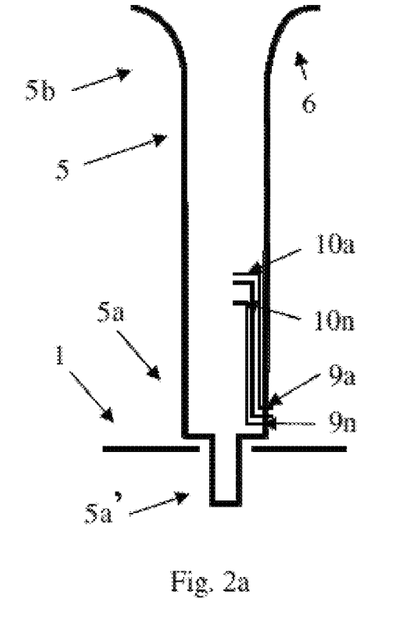
FIG. 2*a* is a schematic illustration of a cross-section of a socket according to an embodiment of the invention.
Figure 2B:
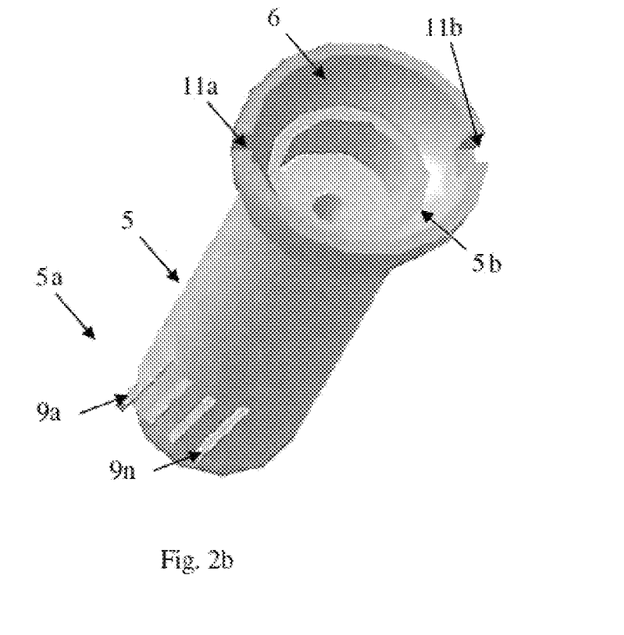
FIG. 2*b* is an isometric view of a socket according to an embodiment of the invention.

FIGS. 1a-1d also show a socket 5 that is attached to the drive housing 1. In the illustrated embodiment, the socket 5 has an essentially elongated shape and comprises an essentially cylindrical opening for accommodating a pin (not shown). FIGS. 1a, 1b, 1c and 1d also show that a first second end 5a of the socket 5 is attached to the bottom plate of the drive housing 1 at an angle of approximately 90° so that the socket 5 extends through the entire drive housing 1. The socket 5 can be held in the drive housing 1 by means of projecting edges around the circumference of the socket 5 so that the socket 5 can be held in an opening in the bottom plate of the drive housing 1 as shown in FIG. 1d. In the shown embodiments of FIGS. 2a and 2d, a flared socket section 6 (or 6') is attached to a second first end 5b (or 5'b) of the socket 5 (or 5'). As illustrated in FIG. 2a, the flared socket section 6 is integrally formed with the socket 5. The skilled person would know that these components could be connected via a thread connection 5'b', formed as part of second first end 5'b, so that the flared socket section 6' can simply be screwed onto the second first end 5'b of the socket 5', as shown in FIG. 2d. Alternatively, the flared socket section 6 may be attached to the second first end 5b of the socket, and the first second end 5a attached to the drive housing by means of a mechanical connection, such as for example a screw connection 5a', as shown in FIG. 2a. As shown in FIG. 1c, the drive housing lid 3 could be held in place by means of the flared socket section 6 when the flared socket section 6 is being installed on the socket 5.

FIG. 1a also shows a PCB board 8, wherein the second socket contacts 9a-9n of the socket 5 are connected to corresponding contacts on the PCB board 8. In the example that is shown in FIG. 1a, the PCB board 8 is located in the drive housing 1 and connects the contacts of the electrical interface 4 to the second socket contacts 9a-9n of the socket 5. However, the skilled person would know that the PCB board 8 could also comprise an electrical controller for controlling the electrical components associated with the mounting plate as well as controlling the electrical motors 2, 2' that are shown in FIG. 1b.

Also shown in FIGS. 1a, 1b, 1c are guide means 7 for adjusting the mounting plate (not shown). In the shown embodiment, the guide means 7 are realized with a lever that is functionally attached via various gear wheels to the electrical motors 2, 2'. Depending on the sense of rotation of the electrical motors 2, 2', the guide means 7 can move up or down to adjust the position of mounting plate. The skilled person would now that the mounting plate could comprise corresponding retaining means for holding the guide means 7.

FIG. 2a shows a view of a cross-section of a socket 5 according to an embodiment of the invention. As it can be seen from FIG. 2a, the socket 5 comprises a plurality of first socket contacts 10a-10n that arranged in the opening of the socket 5 that are connected to corresponding second sockets contacts 9a-9n of the socket 5. From FIG. 2a it can be also seen that the socket 5 is mounted on the drive housing 1 to form a right angle with the bottom plate of the drive housing 1. FIG. 2a also shows the flared socket section 6 attached to the socket 5. FIG. 2b shows an isometric view of a socket 5 according to an embodiment of the invention. The socket 5 could be the socket 5 that is shown in the previous Figures. In FIG. 2b it can be seen that the flared socket section 6 comprises at least one recess 11a, 11b for allowing to install the flared socket section 6 with a mounting tool having a corresponding protrusion.

Figure 2C:
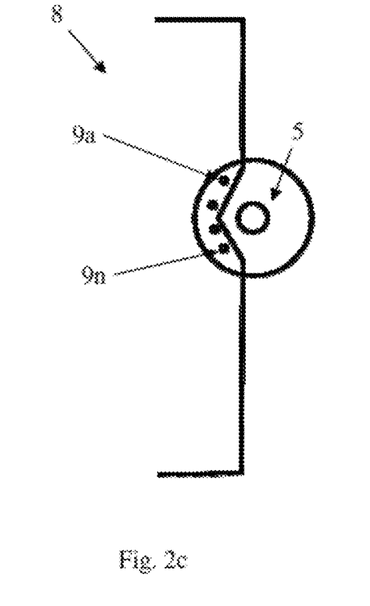
FIG. 2*c* is a schematic illustration of a bottom view of a socket and a printed circuit board (PCB) according to an embodiment of the invention.
Figure 2D:
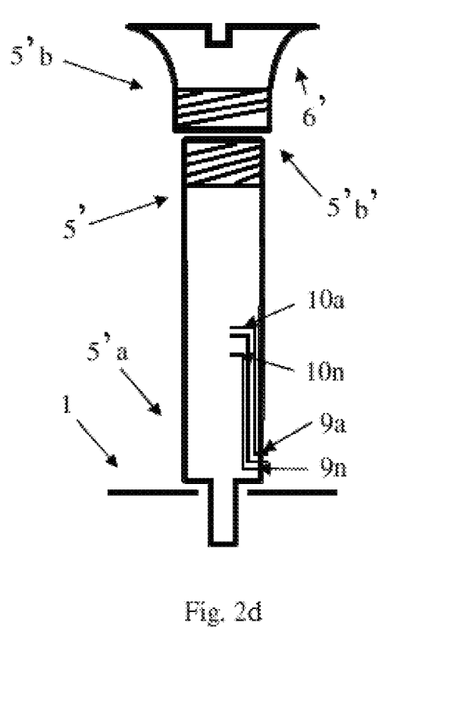
FIG. 2*d* is a schematic illustration of a cross-section of a socket according to an alternative embodiment of the invention, similar to FIG. 2*a*.

FIG. 2c shows a bottom view of a socket 5 and a PCB board 8 according to an embodiment of the invention, where the second socket contacts 9a-9n on the outside of the socket 5 are connected to corresponding contacts on the PCB board 8. The skilled person would know that the second socket contacts 9a-9n of the socket 5 could be connected, e.g. soldered on, to conductor path structures arranged on the PCB board 8.

Figure 3A:
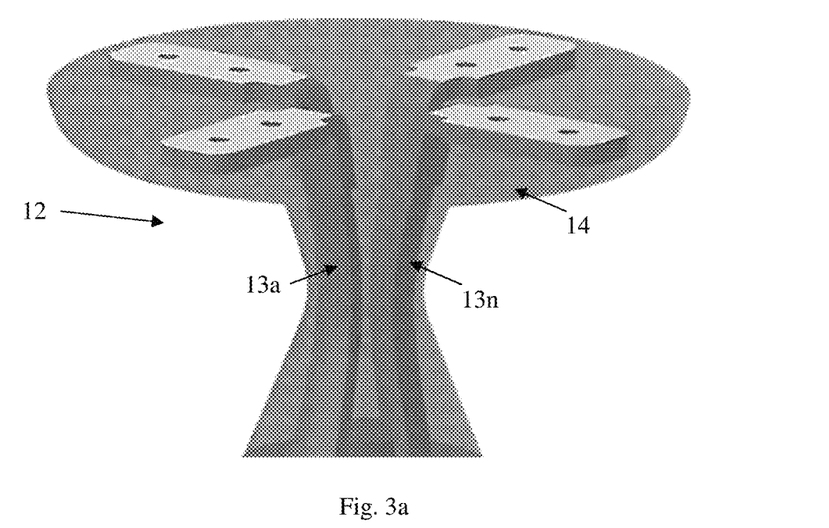
FIG. 3*a* is a detailed perspective view of a pin contact comprising four bendable conductors embedded in a flexible insulating material according to an embodiment of the invention.

FIG. 3a is a detailed view of a pin 12 comprising four bendable conductors 13a-13n embedded in a flexible isolating material 14 according to an embodiment of the invention. In the illustrated embodiment, four bendable conductors 13a-13n are shown that mechanically and electrically connect the mounting plate (not shown) to the pin 12. The four bendable conductors 13a-13n comprise holes on their end sections for riveting the four bendable conductors 13a-13n to the mounting plate. Also, the skilled person would know that more or less than four bendable conductors 13a-13n can be used for connecting the mounting plate to the pin 12, i.e. depending on the intended application of the adjusting system. In the illustrated example, flexible isolating material 14 is arranged between the bendable conductors 13a-13n to isolate the bendable conductors 13a-13n from each other. Also, the skilled person would know that during operation, the bendable conductors 13a-13n can be bent back and forth with the flexible isolating material 14 when the mounting plate is tilted about the socket 5.

Figure 3B:
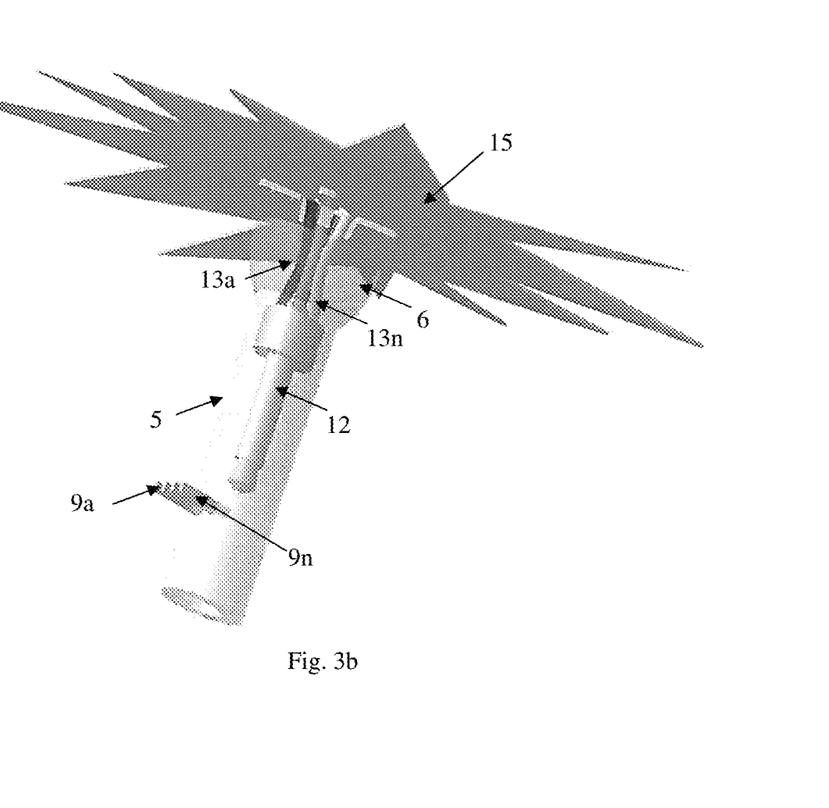
FIG. 3*b* is a perspective view of a mounting plate having a pin that is inserted into a socket according to an embodiment of the invention.

FIG. 3b shows a schematic view of a mounting plate 15 having a pin 12 that is inserted into a socket 5. As already described in regard to FIG. 3a, four bendable conductors 13a-13n are embedded in flexible isolating material 14 to mechanically and electrically connect the mounting plate 15 to the pin 12. In FIG. 3b it is shown that the pin 12 is plugged into the socket 5. It is also shown that the flared socket section 6 allows the four bendable conductors 13a-13n enough space for bending in whatever direction is desired. The socket 5 that is shown in FIG. 3b could be the socket 5 that is shown and described with regard to the previous Figures having second socket contacts 9a-9n.

Figure 4:
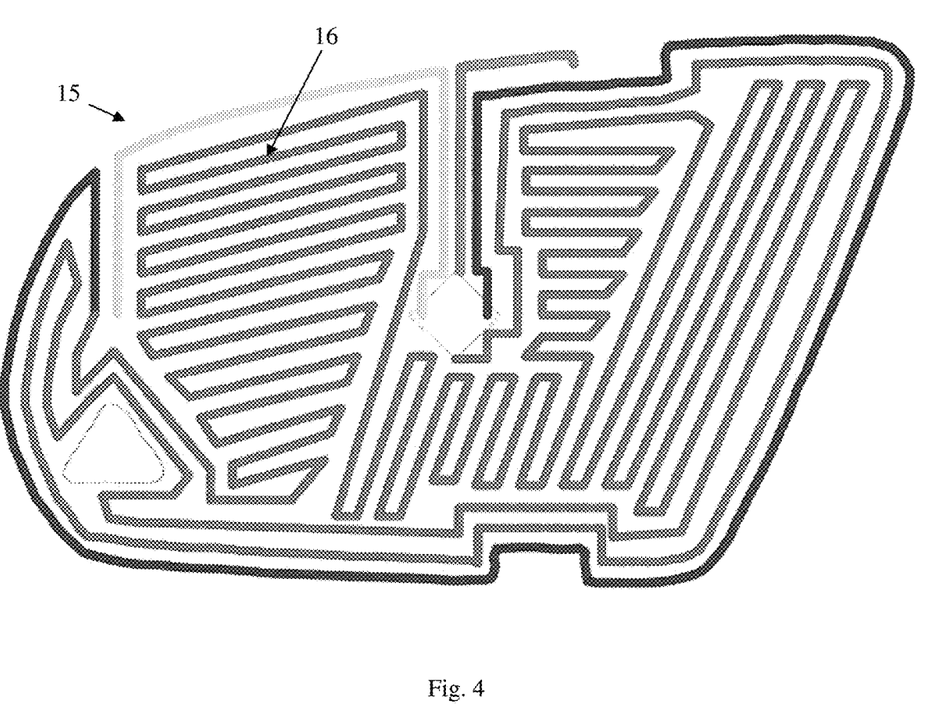
FIG. 4 is a top view of a heating element installed onto a mounting plate.

FIG. 4 shows a top view of a mounting plate 15. Here, it can be seen that four bendable conductors 13a-13n of the pin 12 are connected to the center of the mounting plate 15. Also it is shown that a heating element 16 is arranged around the center of the mounting plate 15.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An adjusting system for a rear view element of a rear view device for a vehicle, comprising:
   a drive housing with an electrical interface;
   a socket, configured as a jack socket, having a first end rigidly attached to the drive housing by one of a mechanical connection, a threaded connection, or a bonded connection and an opening accessible at a second end of the socket, which is located opposite the first end of the socket, the socket including a flared socket section integrally formed with or threaded onto the second end of the socket, wherein at least one of the flared socket section or the socket and the flared socket section together are threaded to the drive housing to form the rigid attachment, the socket comprising at least one first socket contact in the opening and at least one second socket contact on a socket circumference which is electrically connected to the at least one first contact as well as the electrical interface, with
   the first socket contact being spring loaded and/or being arranged on an inlay in the socket opening, and/or
   the second socket contact being spring loaded and/or being connectable to the electrical interface, and
   the pin comprises at least one pin contact that is configured to connect to the at least one first socket contact,
   wherein the socket comprises at least two first and second socket contacts and the pin comprises at least two corresponding pin contacts; and
   a mounting plate for the rear view element connected to a pin configured to be part of a jack plug, wherein at least part of the pin when inserted into the opening of the socket establishes electrical contact between the mounting plate and the drive housing, and the pin mechanically supports the mounting plate for movement relative to the drive housing via the socket.

2. The adjusting system of claim 1, wherein
   the flared socket section includes at least one recess for allowing installation of the flared socket section or the flared socket section and the socket with a mounting tool having a corresponding protrusion, and/or the flared socket section has a general trumpet shape, and/or the flared socket section enables a rocking movement of the mounting plate.

3. The adjusting system of claim 1, wherein
   the socket is arranged on a bottom plate of the drive housing and extends substantially perpendicular to the bottom plate, and/or the longitudinal axis of the socket is arranged on an adjustment axis of the mounting plate, and/or the socket extends through the drive housing.

4. The adjusting system of claim 1, wherein
   a drive housing lid is provided, with the drive housing lid comprising at least one through hole for the socket, the drive housing lid being held on the drive housing by a flared socket section provided at or attached to the second end of the socket.

5. The adjusting system of claim 1, wherein the socket comprises three first and second socket contacts and the pin comprises three corresponding pin contacts.

6. The adjusting system of claim 1, wherein the socket comprises five first and second socket contacts and the pin comprises five corresponding pin contacts.

7. The adjusting system of claim 1, wherein
   a printed circuit board (PCB) is provided within the drive housing and/or is electrically and mechanically connected to the socket, with
   the socket being soldered on the PCB, or the socket being pressed in the PCB, or the PCB being molded with or to the socket, or the socket attached to the PCB by a hotmelt, and/or
   the PCB comprising the electrical interface for connecting the adjusting system to a bus, or a Local Interconnect Network (LIN) Bus, or a control unit of the rear view device and/or the vehicle.

8. The adjusting system of claim 1, comprising
   at least one bendable conductor to electrically and mechanically connect the mounting plate to the pin, so that the mounting plate can pivot
   at an angle of up to approximately 15° with respect to the pin and/or
   around the longitudinal axis of the pin and/or
   on the flared socket section.

9. The adjusting system of claim 8, wherein
   the at least one bendable conductor is at least in part encapsulated in one of a flexible material, an isolating material, or a flexible isolating material, or a plurality of bendable conductors being at least in part encapsulated in the flexible isolating material.

10. The adjusting system of claim 9, wherein the flexible and/or isolating material is one of a thermoplastic adhesive material or a hotmelt.

11. The adjusting system of claim 8, wherein
    the mounting plate comprises or carries a heating element, which is electrically connected via the pin and the socket, and/or
    the mounting plate comprises or carries an electrochromic dimming element, which is electrically connected via the pin and the socket, and/or the mounting plate comprises or carries a display element, which is electrically connected via the pin and the socket, with display element comprising or being comprised by a blind spot indicator.

12. The adjusting system of claim 11, wherein the heating element is arranged on the mounting plate around the at least one pin.

13. The adjusting system of claim 8, wherein the at least one bendable conductor is suited to connect to the mounting plate by means of at least one rivet and/or by soldering, with each bendable conductor being suited to connect to at least one pin contact of the pin.

14. The adjusting system of claim 8 wherein, the at least one bendable conductor has a substantially L shaped form, and/or a plurality of bendable conductors are connected in an essentially crown-shaped manner around the at least one pin.

15. The adjusting system of claim 1, comprising
    at least one drive element or at least one electric motor, and/or guide means connected to the at least one drive element or electric motor, for adjusting the mounting plate.

16. The adjusting system of claim 1, comprising
    a rear view element mounted on the mounting plate, wherein the rear view element comprises at least one mirror element and/or camera.

17. A rear view device for a vehicle, comprising at least one adjusting system according to claim 1, wherein the electrical interface enables an electrical connection of the adjusting system via a single cable to at least one unit of the rear view device and/or the vehicle.

18. The rear view device of claim 17, wherein
    the unit comprises a control unit, a powerfold unit, a turn signal unit, a paddle light unit and/or camera unit, and/or the cable comprises a plus line, a ground line, a bus line and at least one output line.

19. An adjusting system for a rear view element of a rear view device for a vehicle, comprising:
a drive housing with an electrical interface;
a socket, configured as a jack socket, having a first end rigidly attached to the drive housing by one of a mechanical connection, a threaded connection, or a bonded connection and an opening accessible at a second end of the socket, which is located opposite the first end of the socket, the socket including a flared socket section attached to the second end of the socket by a threaded connection wherein at least one of the flared socket section or the socket and the flared socket section together are threaded to the drive housing to form the rigid attachment; and
a mounting plate for the rear view element connected to a pin configured to be part of a jack plug, wherein at least part of the pin when inserted into the opening of the socket establishes electrical contact between the mounting plate and the drive housing, and the pin mechanically supports the mounting plate for movement relative to the drive housing via the socket.

* * * * *